(12) United States Patent
Hsueh

(10) Patent No.: US 7,317,435 B2
(45) Date of Patent: Jan. 8, 2008

(54) PIXEL DRIVING CIRCUIT AND METHOD FOR USE IN ACTIVE MATRIX OLED WITH THRESHOLD VOLTAGE COMPENSATION

(75) Inventor: Wei-Chieh Hsueh, Tainan (TW)

(73) Assignee: TPO Displays Corp., Miao-Li County (TW)

( * ) Notice: Subject to any disclaimer, the term of this patent is extended or adjusted under 35 U.S.C. 154(b) by 604 days.

(21) Appl. No.: 10/842,191

(22) Filed: May 10, 2004

(65) Prior Publication Data
US 2005/0052377 A1 Mar. 10, 2005

(30) Foreign Application Priority Data
Sep. 8, 2003 (TW) .............................. 92124794 A

(51) Int. Cl.
*G09G 3/32* (2006.01)
(52) U.S. Cl. ...................... 345/82; 345/76; 315/169.1
(58) Field of Classification Search ............ 345/76–83; 315/169.1–169.4
See application file for complete search history.

(56) References Cited
U.S. PATENT DOCUMENTS

| | | | |
|---|---|---|---|
| 6,229,506 B1 | 5/2001 | Dawson et al. | |
| 6,583,581 B2 * | 6/2003 | Kaneko et al. | 315/169.3 |
| 6,618,030 B2 * | 9/2003 | Kane et al. | 345/82 |
| 6,903,731 B2 * | 6/2005 | Inukai | 345/204 |
| 6,919,886 B2 * | 7/2005 | Sato et al. | 345/205 |
| 2003/0052843 A1 * | 3/2003 | Yamazaki et al. | 345/82 |
| 2003/0122747 A1 * | 7/2003 | Shannon et al. | 345/76 |
| 2004/0056252 A1 * | 3/2004 | Kasai | 257/72 |

* cited by examiner

*Primary Examiner*—Richard Hjerpe
*Assistant Examiner*—Kimnhung Nguyen

(57) ABSTRACT

A pixel driving circuit for use in an active matrix organic light-emitting diode with threshold voltage compensation includes a transistor, a first capacitor and a second capacitor. The organic light-emitting diode is in communication with the transistor. The first capacitor has a first and a second ends, wherein the first end is coupled to a gate electrode of the transistor. The second capacitor has a third and a fourth ends coupled to the second end of the first capacitor and a ground voltage, respectively. A threshold voltage of the transistor is stored in the first capacitor in a first state, a driving voltage received from a data line is stored in the second capacitor in a second state, and the gate electrode of the transistor is biased with a specified voltage applied to the first and the second capacitors interconnected in series in a third state. A current passing through the organic light-emitting diode is controlled accordingly.

10 Claims, 8 Drawing Sheets

|  | Reset state | Compensation state | Data write-in state | Emission state |
|---|---|---|---|---|
| SW1 | ON | ON | ON | OFF |
| SW2 | ON | ON | OFF | OFF |
| SW3 | ON | OFF | OFF | ON |
| Voltage on data line | Vdd | Vdd | Vdrv | Vdd |

Fig.4(b)

PIXEL DRIVING CIRCUIT AND METHOD FOR USE IN ACTIVE MATRIX OLED WITH THRESHOLD VOLTAGE COMPENSATION

FIELD OF THE INVENTION

The present invention relates to a pixel driving circuit, and more particularly to a pixel driving circuit for use in an active matrix organic light-emitting diode with threshold voltage compensation. The present invention also relates to a pixel driving method of such circuit.

BACKGROUND OF THE INVENTION

Since the typical liquid crystal display (LCD) needs backlight to operate and is complicated in fabrication, alternative displays are further developed. Recently, a display by means of organic light-emitting diodes (OLEDs) has been developed due to its self-light-emitting and easily manufactured features. In addition, the OLED panel has advantages of wide viewing angles, low cost, reduced thickness and flexible operational temperature. The OLEDs can be used as pixel units of an active matrix electron luminescent display, and thus the OLED panel is expected to substitute for the LCD in the near future.

FIG. 1 illustrates a conventional driving circuit for driving an OLED pixel. The pixel unit comprises an organic light-emitting diode OLED, two transistors M1~M2 and a capacitor Cs (so-called as 2T1C). The gate electrode of the transistor M1 is coupled to a scan line 10, and the other two electrodes of the transistor M1 are coupled to a data line 20 and the gate electrode of the transistor M2, respectively. The source and drain electrodes of the transistor M2 are coupled to a source voltage Vdd and the P electrode of the organic light-emitting diode OLED. The N electrode of the organic light-emitting diode OLED is coupled to a ground voltage GND. The capacitor Cs is coupled between the source electrode and gate electrode of the transistor M2.

During operation of the scan line 10, the transistor M1 is switched on. Meanwhile, via the data line 20, a driving voltage is inputted and stored in the capacitor Cs. The driving voltage can also bias the transistor M2 to result in a constant current Id passing through the organic light-emitting diode OLED. The organic light-emitting diode OLED emits light accordingly.

For a purpose of forming the active matrix and its peripheral circuit on the same substrate, a so-called low-temperature polysilicon thin film transistor (LTPS-TFT) technology was developed with improved electrical properties of TFTs and other benefits. However, since the threshold voltage and mobility of such LTPS-TFT vary with manufacturing processes to a certain extent, some problems may occur. For example, under a constant voltage applied to the capacitor Cs, the resulting intensity of current passing through the organic light-emitting diode OLED may be different for the LTPS-TFT manufactured by different processes. The light intensity emitted by the OLED cannot be well expected.

SUMMARY OF THE INVENTION

The present invention provides a pixel driving circuit and a pixel driving method for use in an active matrix organic light-emitting diode, in which the current passing through the organic light-emitting diode is precisely controlled with threshold voltage compensation.

In accordance with a first aspect of the present invention, there is provided a pixel driving circuit for use in an active matrix organic light-emitting diode with threshold voltage compensation. The pixel driving circuit comprises a transistor, a first capacitor and a second capacitor. The organic light-emitting diode is in communication with the transistor. The first capacitor has a first and a second ends, wherein the first end is coupled to a gate electrode of the transistor. The second capacitor has a third and a fourth ends coupled to the second end of the first capacitor and a ground voltage, respectively. The first capacitor stores therein a threshold voltage of the transistor in a first state, the second capacitor stores therein a driving voltage received from a data line in a second state, and the first and the second capacitors interconnected in series and having a specified voltage applied thereto bias the gate electrode of the transistor in a third state. A current passing through the organic light-emitting diode is controlled accordingly.

In one embodiment, the pixel driving circuit further comprises a first switch for controlling the driving voltage received from the data line to be stored in the second capacitor in the second state.

In one embodiment, when the pixel driving circuit is in the first state, a source voltage coupled to the source electrode of the transistor is inputted into the second end of the first capacitor via the data line such that the threshold voltage is stored into the first capacitor.

In one embodiment, the first, the second and the third states are a compensation, a data write-in and an emission states, respectively.

In accordance with a second aspect of the present invention, there is provided a method for driving a pixel of an active matrix organic light-emitting diode. Firstly, a threshold voltage is recorded in a first state. Then, a driving voltage is recorded in a second state. Afterward, a gate electrode of a transistor is biased with a summation voltage of the threshold voltage and the driving voltage to control a current passing through the organic light-emitting diode in a third state.

In one embodiment, the threshold voltage is a threshold voltage of the transistor of the pixel.

In one embodiment, the threshold voltage is recorded into a first capacitor of the pixel.

In one embodiment, the threshold voltage is recorded into the first capacitor under the condition that the first capacitor has a first end coupled to the gate electrode of the transistor and a second end for inputting therein a source voltage coupled to a source electrode of the transistor.

In one embodiment, the driving voltage is recorded into a second capacitor of the pixel.

In one embodiment, the driving voltage to be recorded into the second capacitor is received from a data line via a switch of the pixel in the second state.

In accordance with a third aspect of the present invention, there is provided a pixel driving circuit for use in an active matrix current-controllable light-emitting device with threshold voltage compensation. The pixel driving circuit comprises a transistor, a current-controllable light-emitting device, a first capacitor and a second capacitor. The current-controllable light-emitting device is in communication with the transistor. The first capacitor has a first and a second ends, wherein the first end is coupled to a gate electrode of the transistor. The second capacitor has a third and a fourth ends coupled to the second end of the first capacitor and a ground voltage, respectively. The first capacitor stores therein a threshold voltage of the transistor in a first state, the second capacitor stores therein a driving voltage received from a data line in a second state, and the first and the second capacitors interconnected in series and having a specified voltage applied thereto bias the gate electrode of the transistor in a third state. A current passing through the current-controllable light-emitting device is controlled accordingly.

In one embodiment, the current-controllable light-emitting device is an organic light-emitting diode.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 4(a) and 4(b) are a schematic diagram and a table illustrating operation principle of the pixel driving circuit of FIG. 2;

DETAILED DESCRIPTION OF THE PREFERRED EMBODIMENT

In order to overcome the problem resulting from variation of the threshold voltage in the prior art, the present invention provides a pixel driving circuit for use in an active matrix organic light-emitting diode with threshold voltage compensation.

Figure 1:
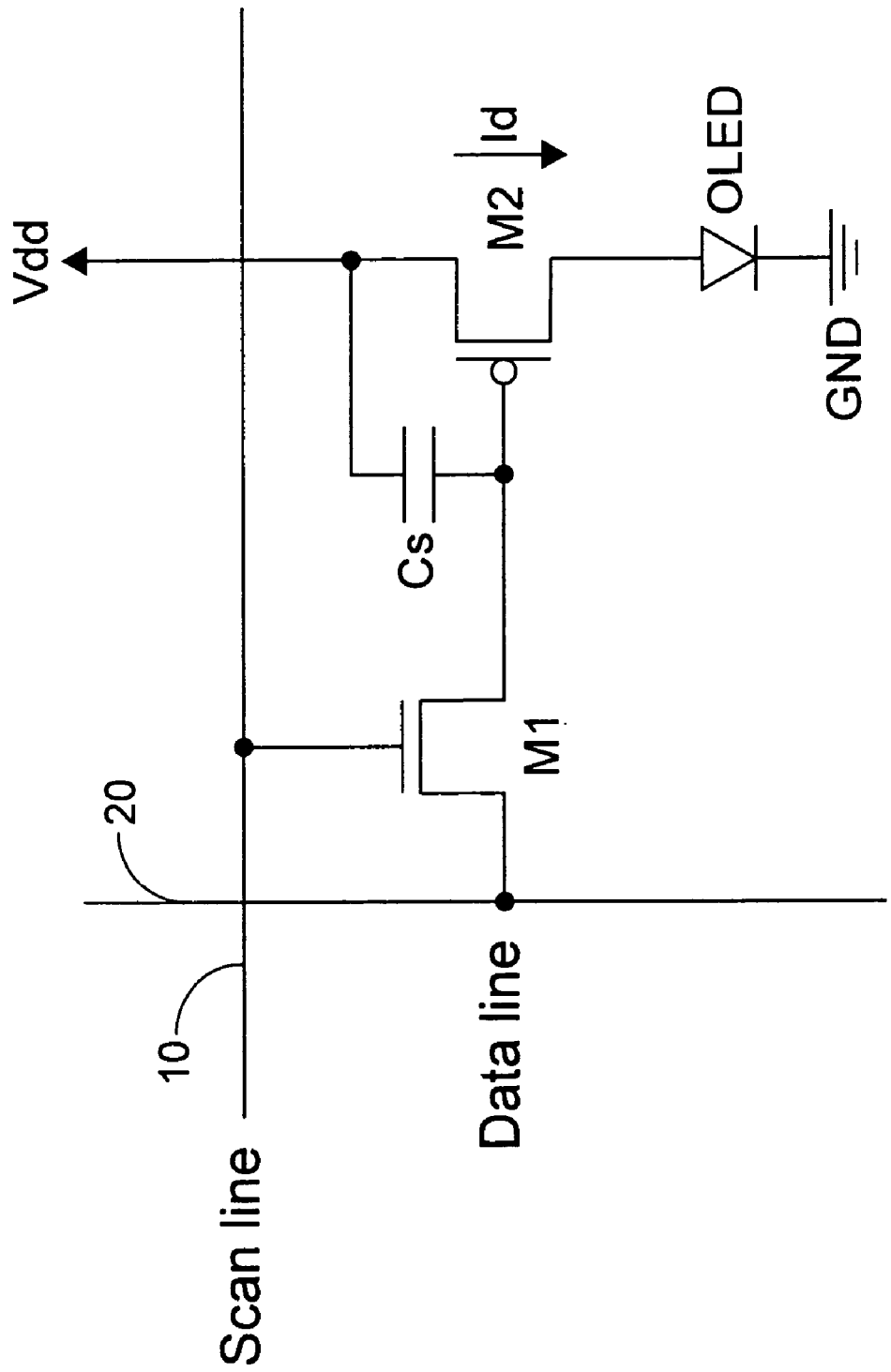
FIG. 1 is a circuit diagram illustrating a conventional pixel driving circuit of an OLED display.
Figure 2:
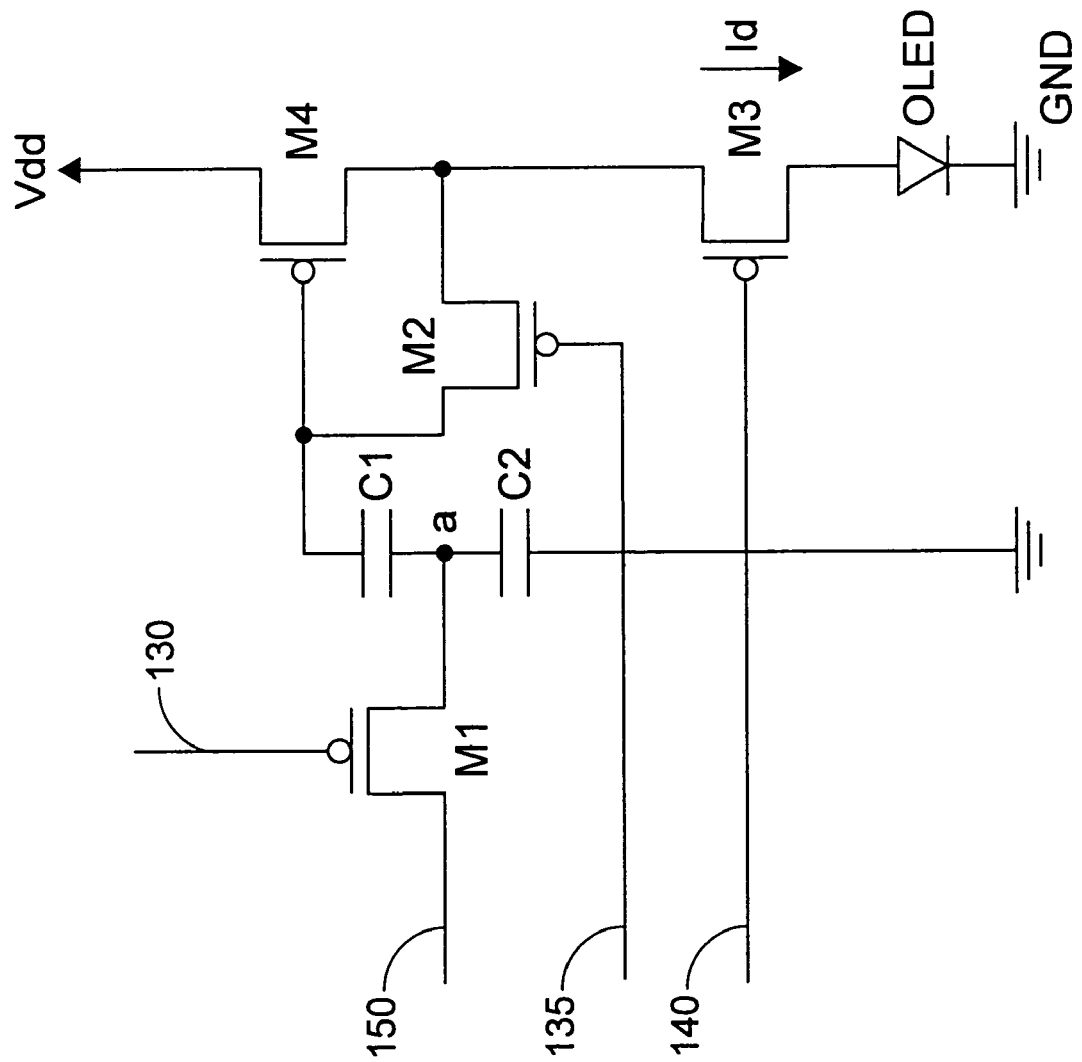
FIG. 2 is a circuit diagram illustrating a pixel driving circuit of an OLED display according to an embodiment of the present invention.

FIG. 2 illustrates a pixel driving circuit for driving an OLED pixel according to a preferred embodiment of the present invention. Each of the pixel units comprises an organic light-emitting diode OLED, four transistors M1~M4 and two capacitors C1~C2 (also referred to as 4T2C). The gate electrode of the transistor M1 is coupled to a first scan line 130, and the other two electrodes of the transistor M1 are coupled to a data line 150 and a node "a", respectively. The gate electrode of the transistor M2 is coupled to a second scan line 135, and the other two electrodes of the transistor M2 are coupled to the drain and the gate electrodes of the transistor M4, respectively. The source, the gate and the drain electrodes of the transistor M3 are coupled to the drain electrode of the transistor M4, a third scan line 140 and the P electrode of the organic light-emitting diode OLED, respectively. The source electrode of the transistor M4 is coupled to a source voltage Vdd. The N electrode of the organic light-emitting diode OLED is coupled to a ground voltage GND. The capacitor C1 is coupled between the gate electrode of the transistor M4 and the node "a". The capacitor C2 is coupled between the node "a" and the ground voltage GND.

Figure 3:
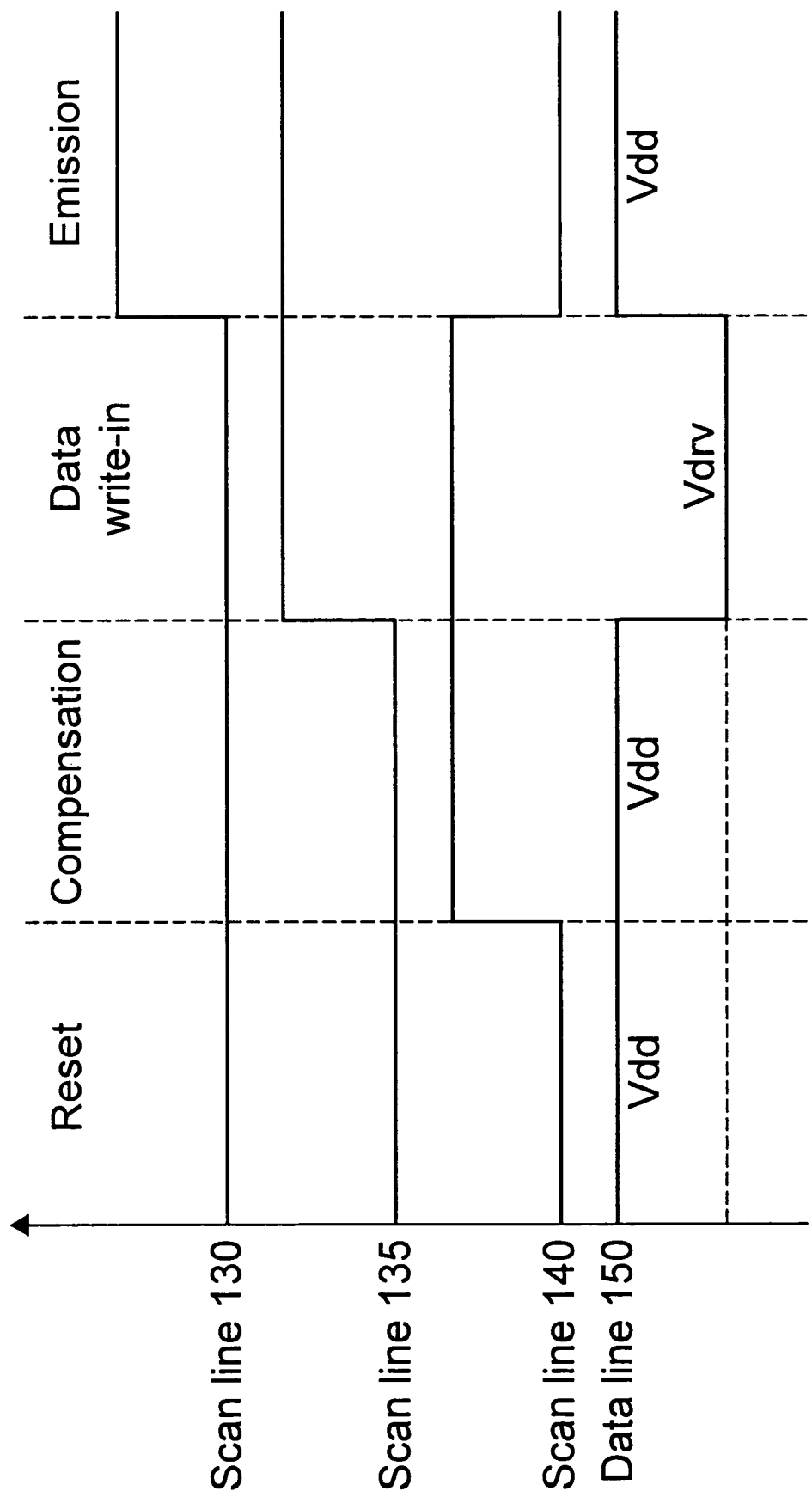
FIG. 3 is a timing waveform diagram showing the signal variations in different states.

The pixel driving circuit of FIG. 2 is operated in alternate reset, compensation, data write-in and emission states, which are controlled by the first scan line 130, the second scan line 135 and the third scan line 140. FIG. 3 is a timing waveform diagram showing the signals passing through the scan lines 130, 135 and 140 and the data line 150 in different states. The operation principle of this pixel driving circuit will be illustrated as follows with reference to FIGS. 2 and 3.

In the reset state, the first scan line 130, the second scan line 135 and the third scan line 140 are enabled to switch on the transistors M1, M2 and M3, and the source voltage Vdd is also transmitted via the data line 150. At this time, all of the charges stored in the capacitors C1, C2 and the parasitic capacitor of the organic light-emitting diode OLED are cleared.

In the compensation state, the first scan line 130 and the second scan line 135 are enabled to switch on the transistors M1 and M2, and the third scan line 140 is disabled such that the transistor M3 is switched off. At this time, the voltage at the node "a" equals to the source voltage Vdd. Thus, the voltage applied to the capacitor C1 defines the threshold voltage Vth of the transistor M4.

In the data write-in state, the first scan line 130 is enabled to switch on the transistor M1, and the second scan line 135 and the third scan line 140 are disabled such that the transistors M2 and M3 are switched off. A driving voltage Vdrv is transmitted via the data line 150. Since the voltage at the node "a" equals to the driving voltage Vdrv, the voltage applied to the capacitor C2 will equal to Vdrv. Thus, the gate voltage $V_G$ of the transistor M4 is computed as $V_G$=Vdrv−|Vth|.

In the emission state, the third scan line 140 is enabled to switch on the transistor M3, and the first scan line 130 and the second scan line 135 are disabled such that the transistors M1 and M2 are switched off. The source voltage Vdd is also transmitted via the data line 150. At this time, the voltage $V_{GS}$ crossing the gate and the source electrodes of the transistor M4 is computed as $V_{GS}=V_G-V_S$=(Vdrv−|Vth|)−Vdd, where Vs is the source voltage. Thus, the driving current Id passing through the organic light-emitting diode OLED can be obtained according to the following formula:

$$Id = 1/2 \times k \times (V_{GS} + |Vth|)^2$$
$$= 1/2 \times k \times (Vdrv - |Vth| - Vdd + |Vth|)^2$$
$$= 1/2 \times k \times (Vdrv - Vdd)^2$$

where k is a device parameter.

As will be understood from the above formula, the current Id passing through the organic light-emitting diode OLED is no longer a function of the threshold voltage of the transistor M4. In other words, the current Id is independent of the threshold voltage of the transistor M4, and the capacitor C1 has stored the threshold voltage of the transistor M4 in the compensation state. Thus, in the emission state, the threshold voltage stored in the capacitor C1 and the threshold voltage of the transistor M4 will be offset such that the current Id passing through the organic light-emitting diode OLED is only a function of the driving voltage Vdrv and no longer varies with the threshold voltage. The current Id passing through the organic light-emitting diode OLED can be precisely controlled accordingly.

Figure 4A:
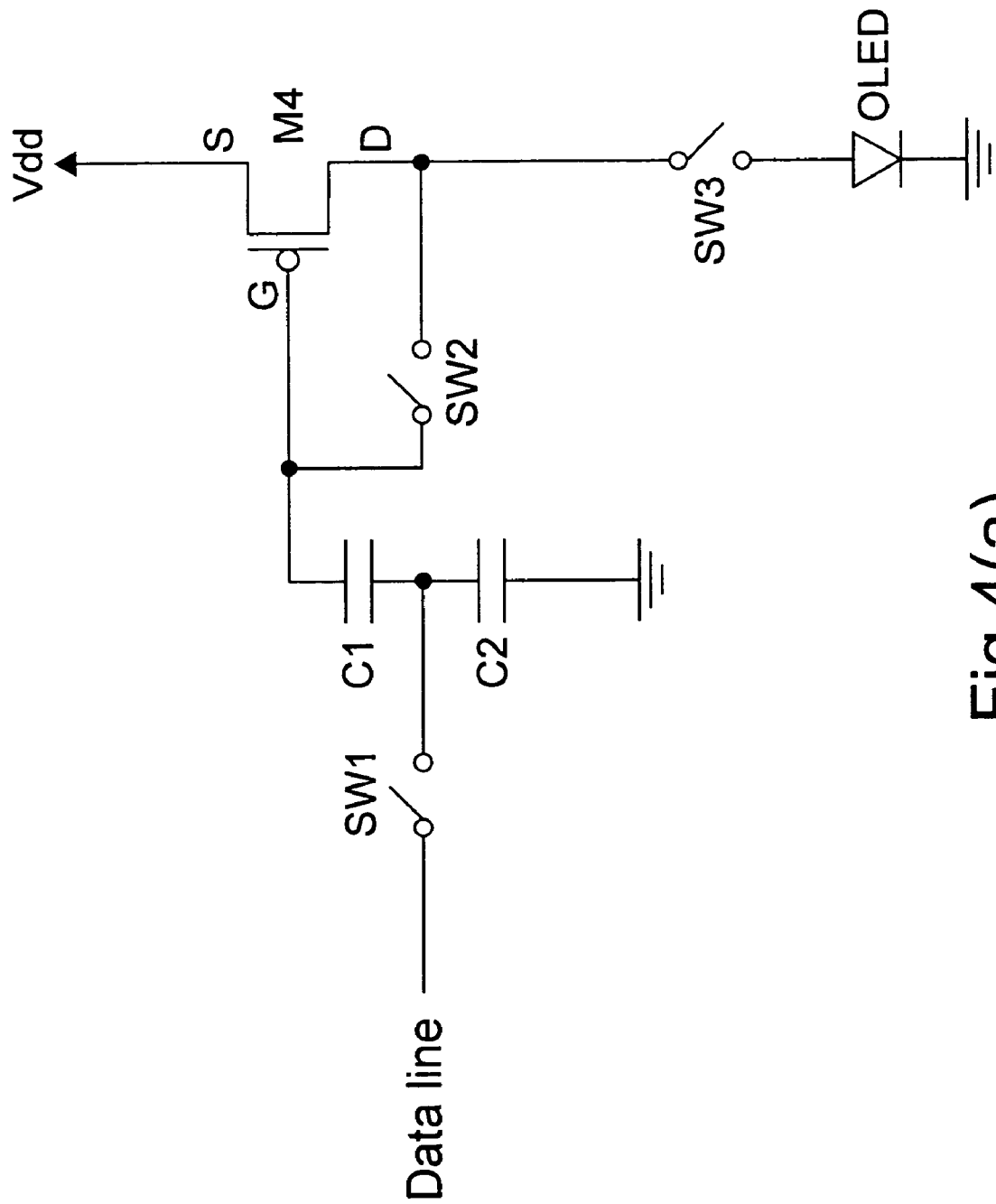

The pixel driving circuit shown in Fig. 4(a) is similar to that of FIG. 2, except that the transistors M1~M3 are replaced by three alternative switches SW1~SW3. When state changes, these switches SW1~SW3 are either switched on or switched off, as is illustrated in a table of FIG. 4(b). In the reset state, the switches SW1, SW2 and SW3 are all switched on, and the source voltage Vdd is inputted via the data line. In the compensation state, the switches SW1 and SW2 are switched on, but the switch SW3 is switched off. At this time, the source voltage Vdd is still inputted via the data line. In the data write-in state, the switch SW1 is switched on, but the switches SW2 and SW3 are switched off. At this time, it is the driving voltage Vdrv inputted via the data line. In the emission state, the switches SW1 and SW2 are switched off, but the switch SW3 is switched on. At this time, the source voltage Vdd is inputted via the data line.

Figure 5:
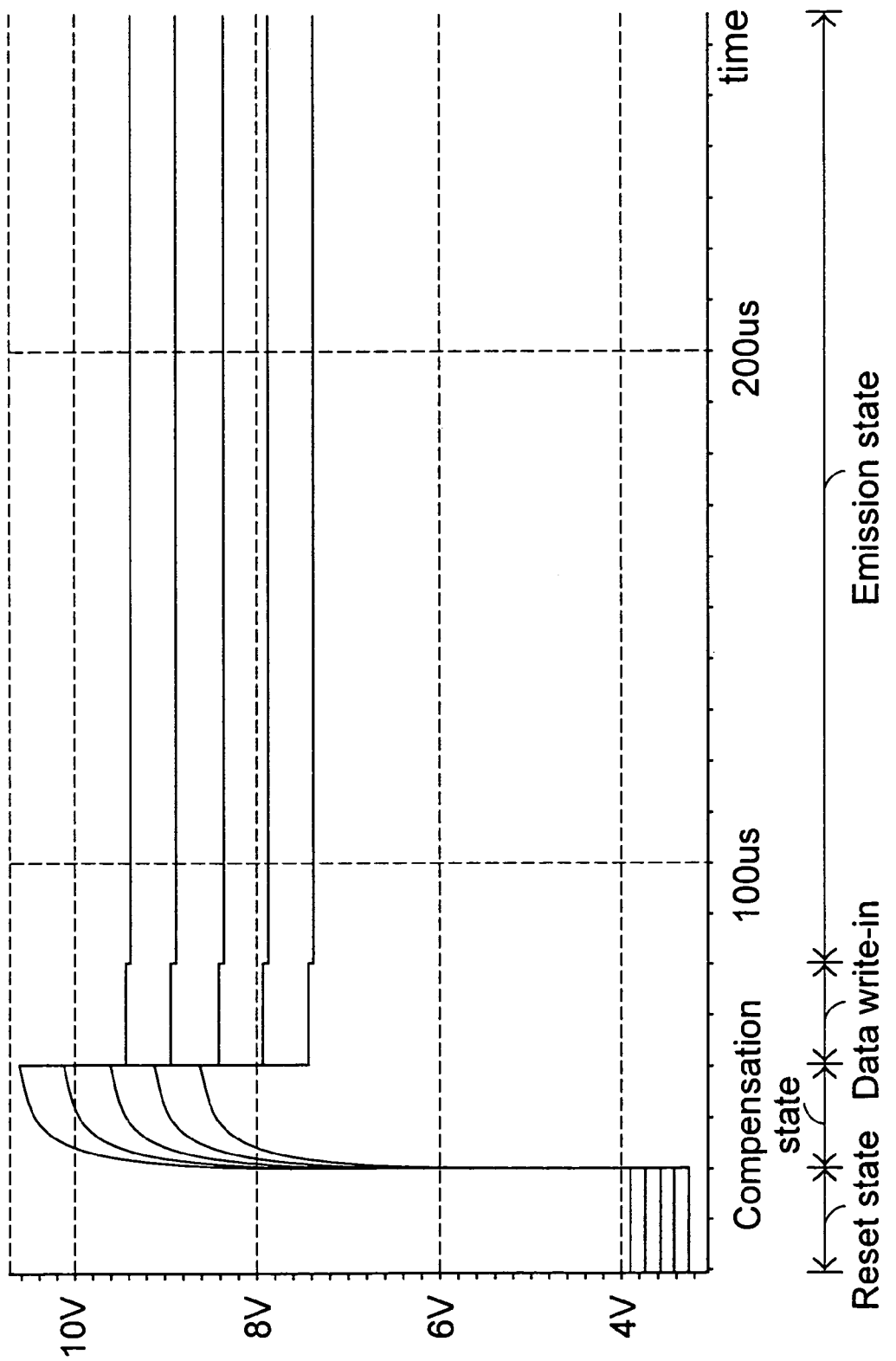
FIG. 5 is a plot illustrating voltage variation of the gate electrode of the transistor M4 according to various threshold voltages of the transistor M4 and a constant driving voltage.

Please refer to FIG. 5, which exemplifies voltage variation of the gate electrode of the transistor M4 according to various threshold voltages of the transistor M4 and a constant driving voltage Vdrv. The gate voltages of the transistor M4 are distinguished after the reset, the compensation, the data write-in and the emission states. That is to say, although the driving voltages Vdrv stored in the capacitor C2 are identical after the four states, the compensation voltages stored in the capacitor C1 are different such that the gate voltages of the transistor M4 are distinguished.

Figure 6:
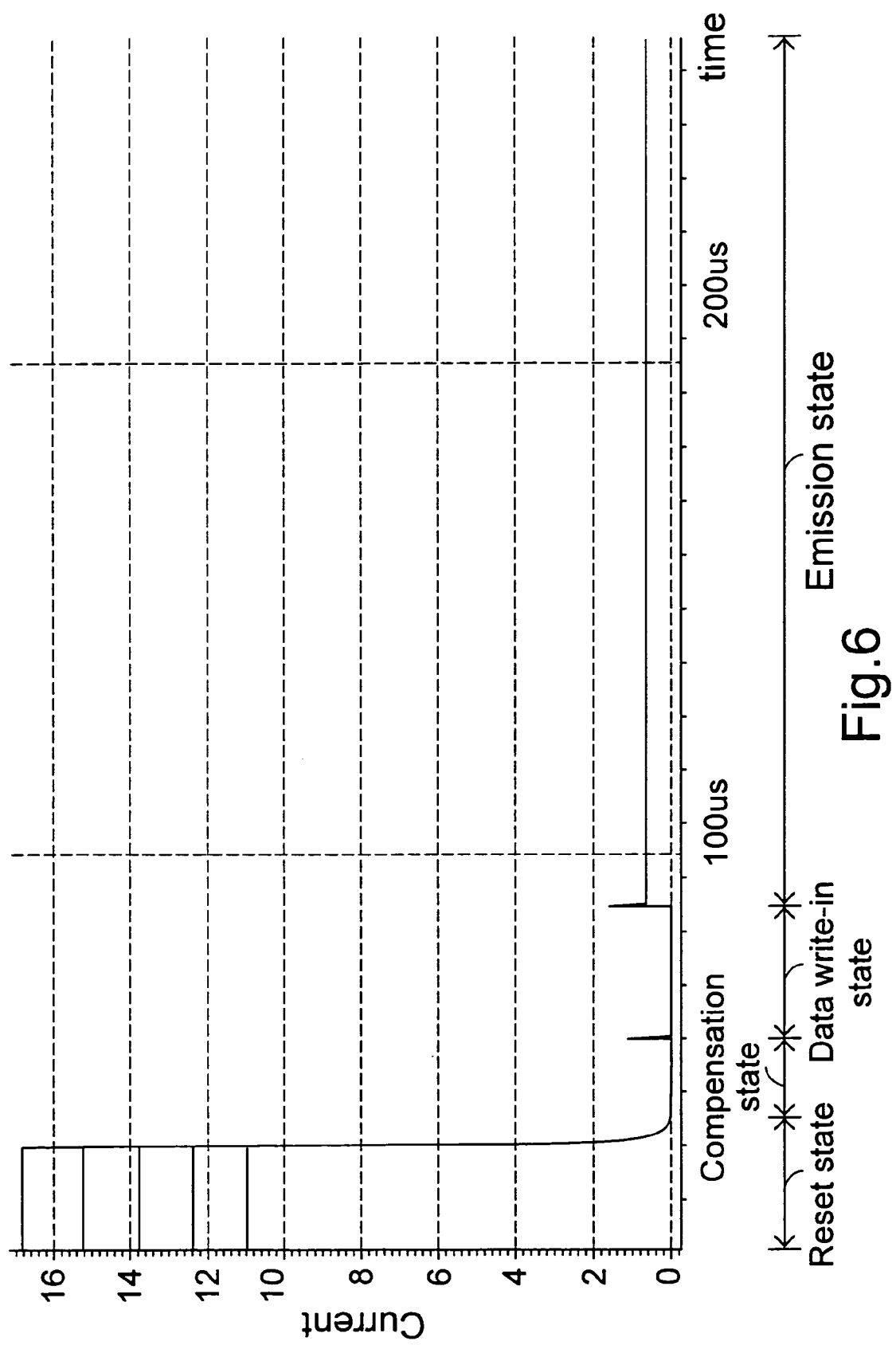
FIG. 6 is a plot illustrating current variation of the current passing through the transistor M4 according to various threshold voltages of the transistor M4 and a constant driving voltage.

Please refer to FIG. 6, which illustrates variation of the current passing through the transistor M4 according to various threshold voltages of the transistor M4 and a constant driving voltage Vdrv. As shown in FIG. 6, the driving currents Id passing through the transistor M4 are almost identical after the reset, the compensation, the data write-in and the emission states. That is to say, the compensation voltage stored in the capacitor C1 is offset by the threshold voltage of the transistor M4. Meanwhile, the driving currents passing through the transistor M4 and the organic light-emitting diode OLED are controlled by the driving voltage Vdrv stored in the capacitor C2. Since the driving voltage Vdrv is constant, the driving currents passing through the transistor M4 and the organic light-emitting diode OLED are substantially identical.

Figure 7:
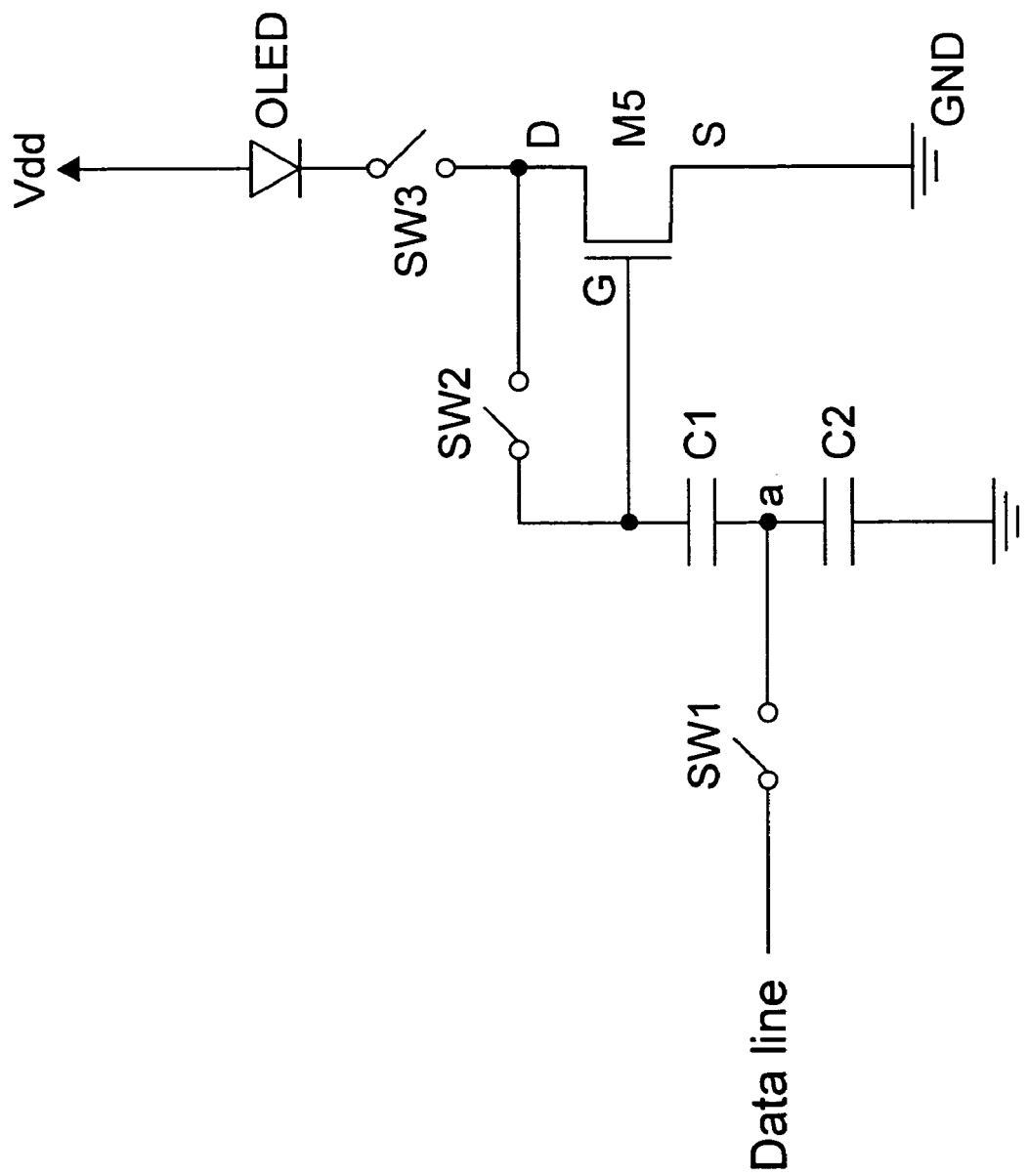
FIG. 7 is a circuit diagram illustrating a pixel driving circuit of an OLED display according to another embodiment of the present invention.

The transistor M4 in FIG. 4(a) is implemented by a PMOS transistor. Alternatively, the PMOS transistor M4 can be replaced by an NMOS transistor M5, as is shown in FIG. 7. The driving circuit shown in FIG. 7 is similar to that of FIG. 4(a) except that the two ends of the switch SW2 are coupled to the drain and the gate electrodes of the transistor M5, respectively, the two ends of the switch SW3 are coupled to the drain electrode of the transistor M5 and the N electrode of the organic light-emitting diode OLED, the P electrode of the organic light-emitting diode OLED is coupled to a source voltage Vdd, and the source electrode of the transistor M5 is coupled to a ground voltage GND. The switches SW1~SW3 are controlled by the first scan line, the second scan line and the third scan line, respectively. Likewise, after operations in the reset, the compensation, the data write-in and the emission states, the current passing through the organic light-emitting diode OLED is not affected by the threshold voltage of the transistor M5.

From the above description, it is understood that the pixel driving circuit and the pixel driving method provided by the present invention can effectively compensate the threshold voltage of the transistor M4 or M5. Therefore, the current passing through the organic light-emitting diode OLED will be precisely controlled according to the driving voltage. The present invention is illustrated by referring to an organic light-emitting diode OLED. Nevertheless, the present invention can be applied to any current-controllable light-emitting device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pixel driving circuit for use in an active matrix organic light-emitting diode with threshold voltage compensation, comprising:
    a transistor;
    an organic light-emitting diode coupled to said transistor;
    a first capacitor having a first and a second ends, said first end being coupled to a gate electrode of said transistor; and
    a second capacitor having a third and a fourth ends coupled to said second end of said first capacitor and a ground voltage, respectively;
    wherein a threshold voltage of said transistor is stored in said first capacitor in a first state, a driving voltage received from a data line is stored in said second capacitor in a second state, and said gate electrode of said transistor is biased with a specified voltage applied to said first and said second capacitors interconnected in series in a third state, thereby controlling a current passing through said organic light-emitting diode.

2. The pixel driving circuit according to claim 1 further comprising a first switch for controlling said driving voltage received from said data line to be stored in said second capacitor in said second state.

3. The pixel driving circuit according to claim 1 wherein a source voltage coupled to the source electrode of said transistor is inputted into said second end of said first capacitor via said data line in said first state such that said threshold voltage is stored into said first capacitor.

4. The pixel driving circuit according to claim 1 wherein said first, said second and said third states are a compensation, a data write-in and an emission states, respectively.

5. A method for driving a pixel of an active matrix organic light-emitting diode, comprising steps of:
    recording a threshold voltage of a transistor in a first state;
    recording a driving voltage in a second state; and
    biasing a gate electrode of said transistor with a summation voltage of said threshold voltage and said driving voltage to control a current passing through said organic light-emitting diode in a third state;
    wherein said threshold voltage is recorded into a first capacitor of said pixel, and wherein said first capacitor has a first end coupled to said gate electrode of said transistor and a second end for inputting a source voltage coupled to a source electrode of said transistor.

6. The method according to claim 5 wherein said threshold voltage is a threshold voltage of said transistor of said pixel.

7. The method according to claim 5 wherein said driving voltage is recorded into a second capacitor of said pixel.

8. The method according to claim 7 wherein said driving voltage to be recorded into said second capacitor is received from a data line via a switch of said pixel in said second state.

9. A pixel driving circuit for use in an active matrix current-controllable light-emitting device with threshold voltage compensation, comprising:
    a transistor;

a current-controllable light-emitting device coupled to said transistor;

a first capacitor having a first and a second ends, said first end being coupled to a gate electrode of said transistor; and a second capacitor having a third and a fourth ends coupled to said second end of said first capacitor and a ground voltage, respectively;

wherein a threshold voltage of said transistor is stored in said first capacitor in a first state, a driving voltage received from a data line is stored in said second capacitor in a second state, and said gate electrode of said transistor is biased with a specified voltage applied to said first and said second capacitors interconnected in series in a third state, thereby controlling a current passing through said current-controllable light-emitting device.

10. The pixel driving circuit according to claim 9 wherein said current-controllable light-emitting device is an organic light-emitting diode.

* * * * *